H. T. Merrill,
Piano.
Nº 24,396.   Patented June 14, 1859.
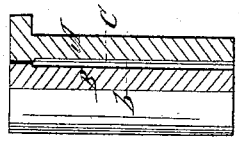
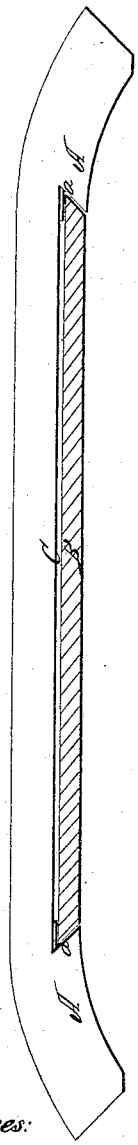
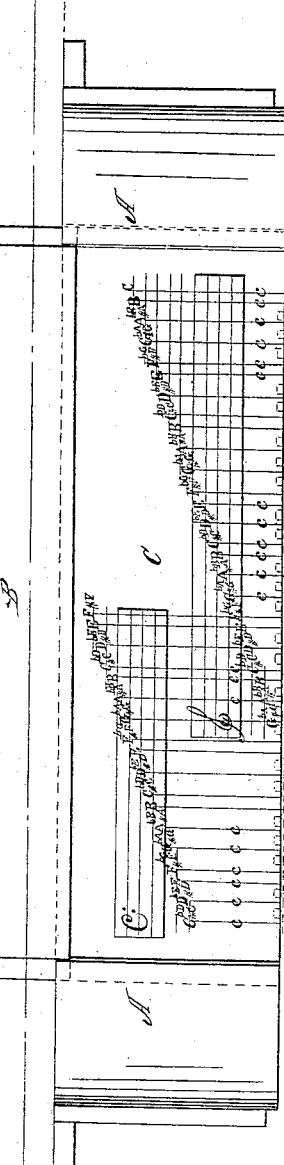
Witnesses:
Inventor:

UNITED STATES PATENT OFFICE.

H. T. MERRILL, OF GALENA, ILLINOIS.

MUSICAL INSTRUMENT.

Specification of Letters Patent No. 24,396, dated June 14, 1859.

*To all whom it may concern:*

Be it known that I, H. T. MERRILL, of Galena, in the county of Jo Daviess and State of Illinois, have invented a new and useful Improvement Applicable to Pianofortes and other Musical Instruments Played in a Similar Manner by Keys; and I do hereby declare that the following is a full, clear, and exact description of the same, reference being had to the accompanying drawings, forming part of this specification, in which—

Figure 1 is a front view of the name board, and adjacent parts of a pianoforte illustrating my invention. Fig. 2 is a horizontal section of the name board and top view of the front portion of the case. Fig. 3 is a vertical section.

Similar letters of reference indicate corresponding parts in the several figures.

The object of my invention is to facilitate the learning of the location of the notes and their indicative letters upon the bass and treble staffs and at the same time the association of the location of every note upon the staffs with its respective key on the key board of a piano-forte, melodeon, organ or other musical instrument having a key board of similar character; and to this end the nature of my invention consists in the employment in combination with a vertically sliding name board or board occupying the usual position of the name board of a piano-forte, or other keyed instrument, extending the whole length of the key board, of a fixed board which I call the "gamut board" having represented upon it the bass and treble staffs and the indicating letters of the notes arranged above their respective keys, said staff board being so arranged behind the name board, or its equivalent, as to be exposed by sliding up, and concealed by sliding down the last mentioned board.

A represents the solid front portion of the case, behind the key board.

B is the name board upon which the name of the maker of the instrument is ordinarily inscribed, said board being of the whole length of the key board fitted to slide in dove-tail groove *a, a,* in the part A, of the case.

C is the "gamut board" having engraved, or otherwise delineated upon it, or faced with paper or other material having engraved, printed or otherwise inscribed upon it, the trebles and bass staffs and such a system of vertical lines *c, c,* (Fig. 1) as will point to or meet the keys of the natural notes on the key board, and having each of such lines indicated on the staff by the proper letter, and having marked upon it in the proper horizontal spaces between such lines, the letters and signs which will indicate the sharp and flat keys below such spaces as will be readily understood by reference to Fig. 1, where the keys are represented in red outline. A cavity *b,* (Fig. 3) is left between the name board and the staff board to prevent the latter being chafed by the sliding of the name board over it.

What I claim as my invention and desire to secure by Letters Patent is:—

The gamut board C, applied above and behind the keys, in combination with a sliding name board B, or its equivalent substantially as herein specified.

H. T. MERRILL.

Witnesses:
G. W. FULLER,
JOSHUA BROOKES.